(12) United States Patent
Mortzheim et al.

(10) Patent No.: US 12,480,444 B2
(45) Date of Patent: Nov. 25, 2025

(54) SYSTEMS AND METHODS FOR INTEGRATING AUXILIARY ENERGY AND WASTE HEAT RECOVERY FROM GAS TURBINE ENGINES

(71) Applicant: GE Infrastructure Technology LLC, Greenville, SC (US)

(72) Inventors: Jason P. Mortzheim, Gloversville, NY (US); Giridhar Jothiprasad, Clifton Park, NY (US); Todd Andrew Jankowski, Ballston Lake, NY (US); Dhinesh Thanganadar, Didcot (GB); Joel Meador Hall, Simpsonville, SC (US)

(73) Assignee: GE Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 18/427,532

(22) Filed: Jan. 30, 2024

(65) Prior Publication Data

US 2025/0243806 A1 Jul. 31, 2025

(51) Int. Cl.
*F02C 6/18* (2006.01)
*F02C 7/12* (2006.01)

(52) U.S. Cl.
CPC .................. *F02C 6/18* (2013.01); *F02C 7/12* (2013.01); *F05D 2260/213* (2013.01)

(58) Field of Classification Search
CPC .............. B01D 2257/504; B01D 53/78; B01D 2258/0283; B01D 2253/202; B01D 2258/06; B01D 53/62; B01D 53/82; C01B 32/50; H01L 23/60; H01L 25/0753; H10D 86/441; H10D 86/451; H10D 89/60; H10H 20/857; H10H 29/142; F01K 23/10; F01K 3/24; F01K 3/242; F01K 3/26; F01K 3/18; F01K 3/181; F01K 3/183; F01K 3/185; F01K 3/186; F01K 3/188; F01K 3/22
See application file for complete search history.

(56) References Cited

U.S. PATENT DOCUMENTS

| | | | |
|---|---|---|---|
| 4,259,836 A | 4/1981 | Finckh | |
| 5,727,379 A * | 3/1998 | Cohn | F03G 6/067 60/39.182 |
| 8,839,621 B2 * | 9/2014 | Ferguson | F02C 6/02 60/647 |

(Continued)

FOREIGN PATENT DOCUMENTS

| | | | |
|---|---|---|---|
| CN | 104454409 A | * | 3/2015 |
| CN | 104454409 B | * | 4/2018 |

(Continued)

*Primary Examiner* — Craig Kim
(74) *Attorney, Agent, or Firm* — Armstrong Teasdale LLP

(57) ABSTRACT

An integration system for extracting power, the integration system including a flue flow source configured to supply flue flow thermal energy to a heat exchanger and an auxiliary energy source (AES) configured to selectively supply auxiliary thermal energy to a supplemental heat exchanger. The integration system includes a controller configured to determine whether the AES is supplying auxiliary thermal energy to the supplemental heat exchanger; and if the AES is supplying auxiliary thermal energy to the supplemental heat exchanger, cause a turbine to extract power from both the flue flow and from the auxiliary thermal energy.

19 Claims, 9 Drawing Sheets

(56) References Cited

U.S. PATENT DOCUMENTS

| | | | |
|---|---|---|---|
| 10,483,558 B1* | 11/2019 | Parehk | F01K 7/16 |
| 12,172,124 B2* | 12/2024 | Noborisato | B01D 53/1425 |
| 2007/0012041 A1* | 1/2007 | Goldman | F03G 6/005 |
| | | | 60/641.8 |
| 2011/0127773 A1 | 6/2011 | Freund et al. | |
| 2011/0131989 A1 | 6/2011 | Sampson et al. | |
| 2011/0302921 A1* | 12/2011 | Ferguson | F02C 1/05 |
| | | | 60/644.1 |
| 2012/0192564 A1* | 8/2012 | Mishima | F22B 33/18 |
| | | | 60/660 |
| 2015/0128558 A1 | 5/2015 | Gülen | |
| 2015/0267566 A1* | 9/2015 | Vamvas | F28D 20/02 |
| | | | 60/659 |
| 2017/0030264 A1* | 2/2017 | Chen | F01K 7/18 |
| 2017/0314466 A1* | 11/2017 | Mokheimer | F03G 6/064 |
| 2017/0341942 A1* | 11/2017 | Harper, Jr. | F01K 7/16 |
| 2017/0350319 A1* | 12/2017 | Wu | F01D 15/10 |
| 2025/0010239 A1* | 1/2025 | Realff | C01B 32/50 |
| 2025/0090995 A1* | 3/2025 | Gurkan | B01D 53/1493 |

FOREIGN PATENT DOCUMENTS

| | | | | |
|---|---|---|---|---|
| CN | 110404387 A | * | 11/2019 | |
| CN | 110700944 A | * | 1/2020 | C07C 1/12 |
| EP | 526816 A1 | | 2/1993 | |
| WO | WO-2011073672 A1 | * | 6/2011 | B01D 53/1425 |
| WO | WO-2011100801 A1 | * | 8/2011 | B01D 53/1425 |
| WO | WO-2011148152 A2 | * | 12/2011 | F01K 17/04 |
| WO | 2012171803 A1 | | 12/2012 | |
| WO | WO-2014032113 A1 | * | 3/2014 | B01D 53/1475 |
| WO | WO-2014127410 A1 | * | 8/2014 | B01D 53/1425 |
| WO | WO-2019112604 A1 | * | 6/2019 | F01K 13/02 |
| WO | WO-2023092011 A1 | * | 5/2023 | B01D 53/62 |

* cited by examiner

SYSTEMS AND METHODS FOR INTEGRATING AUXILIARY ENERGY AND WASTE HEAT RECOVERY FROM GAS TURBINE ENGINES

TECHNICAL FIELD

The field of the disclosure relates generally to generating power from auxiliary energy sources and more particularly, to methods and systems for integrating auxiliary energy and waste heat recovery from gas turbine engines.

BACKGROUND

Gas turbines are widely used in a variety of commercial operations, such as power generation operations. Gas turbines generally include a compressor, at least one combustor, and a turbine (e.g., an expansion turbine). Conventionally, the compressor compresses a working fluid and discharges the compressed working fluid to the combustor wherein fuel is injected into the flow of compressed working fluid and the resulting mixture is ignited to produce combustion gases. The combustion gases exit the combustor and are channeled to the turbine where they expand to produce work which may be converted into electrical power. At least some known gas turbines generate additional power using thermal energy extracted from exhaust gases.

Integrating renewable energy sources with gas turbine engines enables power generation systems to generate consistent power, as demanded by the power grid, while conserving resources and reducing emissions. However, integration of power generation systems for generating power from consistent power sources and power generation systems for generating power from intermittent sources, when, or if, available, may require transition and/or reconfiguration down time. Furthermore, it may be particularly challenging to integrate unpredictable intermittent energy sources with minimal advanced warning for preparing to transition between systems.

Accordingly, a need exists for systems and methods of integrating auxiliary power sources with power generated from gas turbine engines.

SUMMARY

In one aspect, an integration system for extracting power is provided. The integration system includes a flue flow source configured to supply flue flow thermal energy to a heat exchanger, an auxiliary energy source (AES) configured to selectively supply auxiliary thermal energy to a supplemental heat exchanger, and a controller coupled to the flue flow source and the AES. The controller is configured to determine whether the AES is supplying auxiliary thermal energy to the supplemental heat exchanger, and if the AES is supplying auxiliary thermal energy to the supplemental heat exchanger, cause a turbine to extract power from both the flue flow thermal energy and from the auxiliary thermal energy.

In another aspect, an integration system for extracting power is provided. The integration system includes a flue flow source configured to supply flue flow thermal energy to a heat exchanger, an auxiliary energy source (AES) configured to selectively supply auxiliary thermal energy to a supplemental heat exchanger, and a post-combustion carbon capture system to receive the flue flow after the flue flow passes through the heat exchanger. The system includes a controller coupled to the flue flow source. The controller is configured to cause a turbine to extract power from the flue flow thermal energy extracted by the heat exchanger and auxiliary thermal energy extracted by the supplemental heat exchanger. In another aspect, a method of operating an integration system for extracting power from an auxiliary energy source (AES) is provided. The method includes determining whether an auxiliary energy source (AES) is supplying auxiliary thermal energy to a supplemental heat exchanger and, if the AES is supplying auxiliary thermal energy to the supplemental heat exchanger, then causing a turbine to generate power from the auxiliary thermal energy.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
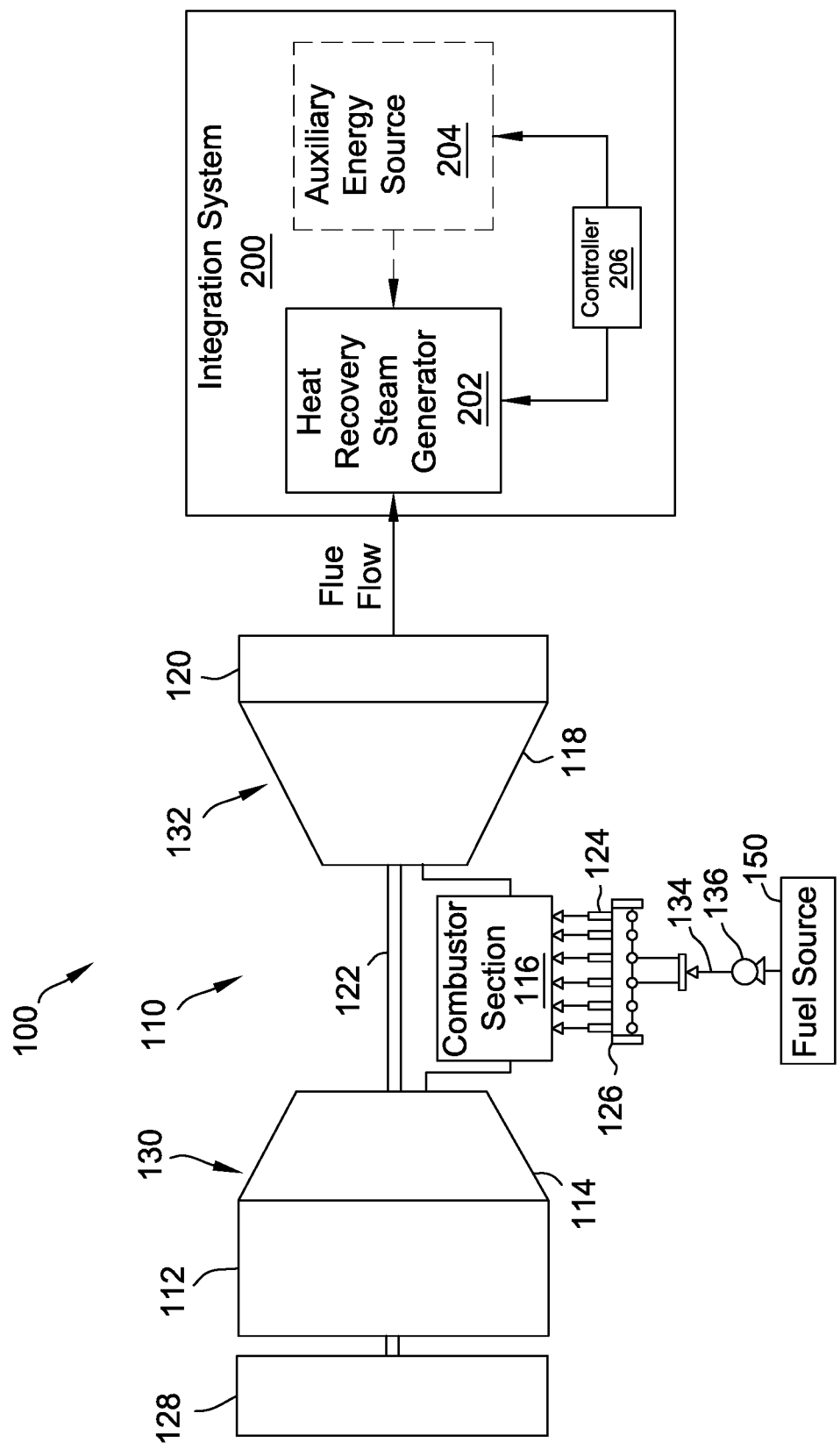
FIG. 1 is a schematic illustration of an exemplary power generation system including a gas turbine engine and an integration system.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings. The singular forms "a,"

"an," and "the" include plural references unless the context clearly dictates otherwise. "Optional" or "optionally" means that the subsequently described event or circumstance may or may not occur and that the description includes instances where the event occurs and instances where it does not. Furthermore, references to "one embodiment" are not intended to be interpreted as excluding the existence of additional embodiments that also incorporate the recited features. Moreover, unless explicitly stated to the contrary, embodiments "including" or "having" an element or a plurality of elements having a particular property may include additional such elements not having that property.

In exemplary embodiments described herein, an integration system for producing power is provided for use with flue flow, e.g., flue flow associated with a gas turbine engine. In the exemplary embodiment, the integration system may extract power from either, or both, a flue flow energy source and/or an auxiliary energy source (AES). For example, power may be generated using flue thermal energy extracted from flue flow discharged from the gas turbine engine using the integration system having a heat recovery steam generator (HRSG). The HRSG may be also referred to herein as a "heat recovery $sCO_2$ generator," where the expression "$sCO_2$," refers to supercritical carbon dioxide. The integration system also selectively generates power using auxiliary thermal energy from the AES. The AES may include a renewable energy source, such as solar, wind, bioenergy, and/or geothermal energy sources. In some embodiments, the AES may include a thermal energy storage, for example, and without limitation, sand-based storage, ceramic blocks, and/or molten salts. In some embodiments, the renewable energy source may be inconsistently available and/or unpredictable and may be referred to herein as an "intermittent energy source." Moreover, in some embodiments described herein, the integration system enables power to be generated from the intermittent energy source, when available, while also being capable of generating consistent energy and enabling a consistent supply of power to be generated, e.g., as demanded by the power grid or a mechanical load, thereby utilizing renewable energy sources when available to improve sustainability.

In embodiments described herein, the integration system may be operated in a plurality of modes including a base mode, a combination mode, and/or an auxiliary mode. In the base mode, the thermal energy extracted from the flue flow in the HRSG is used to generate power (e.g., in a steam turbine), in addition to the power generated by the gas turbine engine. In the combination mode, the integration system generates power from the auxiliary energy source and the thermal energy in the flue flow, in addition to the power generated by the gas turbine engine. In the auxiliary mode, the integration system extracts energy only from the auxiliary energy source. In the exemplary embodiment, the integration system is modular, enabling the system to be selectively operated in any of the modes, e.g., the base mode, the combination mode, and/or the auxiliary mode.

In some embodiments, the auxiliary energy source may be a solar energy source, which intermittently generates energy, e.g., during sunlight hours. In some embodiments, the integration system may be operated in the combination mode, and/or the auxiliary mode, during times when the auxiliary energy source is available. The integration system may be operated in the base mode during times when the auxiliary energy source is not available. For example, in embodiments where the auxiliary energy source includes a solar energy source, the integration system may be operated in combination mode during daylight hours and operated in the base mode during the night or when there is insufficient sunlight.

In some embodiments, the integration system includes a controller and one or more sensors that detect conditions of the integration system. In some embodiments, the controller automatically selects an operation mode based on at least one detected operating condition, e.g., detected by the sensors, and/or at least one target operating condition. For example, operating conditions may include a determination of when the auxiliary energy source is collecting energy, a temperature of auxiliary heat, and/or a power output as demanded by the power grid or a mechanical load, for example. In some embodiments, the controller may select an operation mode based on a user selected target operating condition or mode.

In some embodiments, the controller may adjust operating parameters to control an amount of power generated by the integration system. For example, the controller may adjust the mass flow rate of the flue flow, an amount of thermal energy extracted from the flue flow, or an amount of thermal energy extracted from the auxiliary energy source. In some embodiments, the controller may adjust the relative thermal energy extracted from the flue flow and the auxiliary energy source. The controller may adjust any suitable operating parameter(s) in order to facilitate controlling the amount of power generated by the integration system.

In some embodiments, the integration system includes a turbine for generating power from the flue thermal energy and/or the auxiliary thermal energy. The integration system may include a pair of turbines, a first turbine and a second turbine. The integration system may extract thermal energy from the flue flow or the auxiliary energy source using one or more heat exchangers. In some embodiments, flue thermal energy may be extracted by a pair of heat exchangers, a first (high temperature) heat exchanger and a second (lower temperature) heat exchanger. Auxiliary thermal energy may be extracted by one or more supplemental heat exchangers.

In some embodiments, the integration system includes a post-combustion capture (PCC) system for capturing $CO_2$ from the flue flow. In some of such embodiments, the carbon capture system may include an absorber in which a chemical liquid is passed through the flue flow to facilitate absorption of $CO_2$ entrained in the flue flow. After the chemical liquid has passed through the flue flow and bonded (captured) the $CO_2$, it is then routed through the PCC system where the heat is used to release the $CO_2$ in a controlled manner. The released $CO_2$ by-product may be utilized for additional and/or alternative processes and/or sequestered. The post-combustion capture system requires heat, e.g., supplied thermal energy, to release the $CO_2$. In some embodiments, the PCC system may include any process that can benefit from low grade heat, for example, district heating.

Some known $CO_2$ power cycles may be thermally limited to turbine inlet temperatures of less than approximately 600° C. due to operating temperature limitations of economically feasible materials used to manufacture the turbine, connecting piping, and valves located in the high temperature sections of the $sCO_2$ power cycle. If the increased cost of high temperature materials (e.g., nickel-based superalloys) can be justified, turbine inlet temperatures can be higher than 600° C. However, the cost associated with the use of thermally advanced materials may be economically prohibitive. For example, some known $sCO_2$ systems can accept flows up to 600° C. If the temperature of the flow increases beyond 600° C., material thermal limitations may necessitate either a change to more thermally advanced materials and/or to more aggressive cooling of the turbine parts. For example, for sCO$_2$ power systems having flow temperatures above approximately 600° C., gamma prime superalloys may be used, which have significant cost penalties. In some cases, gas turbines also have thermal limitations for exhaust gases in an HRSG and/or a steam Rankine cycle. For example, steam bottoming cycles are typically limited to 620° C. In embodiments described herein, the integration system, including a working fluid of sCO$_2$, is enabled to receive exhaust gases having a wide temperature range of flue flows including up to 640° C. or greater.

Referring now to the drawings, FIG. 1 is a schematic of an exemplary power generation or mechanical drive system 100 including a turbine engine 110, e.g., a gas turbine engine, and an integration system 200 for integrating a heat recovery steam generator (HRSG) 202 with an auxiliary energy source (AES) 204. The AES 204 may be any suitable renewable energy source, for example, and without limitation, a solar energy source, a wind energy source, a bioenergy source, a thermal energy source, and/or a geothermal energy source. In other embodiments, the AES 204 may include any other energy source, for example, and without limitations, a nuclear energy source, a natural gas source, and/or a fossil fuel source, which enables system 100 to function as described herein.

The integration system 200 may receive heat from the AES 204 intermittently, e.g., during periods when the AES 204 is either enabled and/or is able to generate energy. For example, in embodiments where the AES 204 is a solar power source, the integration system 200 receives heat from the AES 204 during daylight hours when the solar power source is capable of converting sunlight into electrical energy. In contrast, the integration system 200 does not receive heat from the AES 204 during the evening/night when there is minimal sunlight available for converting to electrical energy. In some embodiments, the AES 204 may be a thermal energy source, e.g., a stored thermal energy source, and the AES 204 may supply thermal energy generally consistently, e.g., independent of sunlight.

While the exemplary embodiment described herein is illustrated in association with a gas turbine engine, the present technology is not limited to any one particular engine, and one of ordinary skill in the art will appreciate that the current technology may be used in connection with other turbine engines. As used herein, the terms "turbine," "turbine assembly," and "turbine engine" shall be used interchangeably. For example, the flue flow, supplied to the integration system 200, may be exhausted from other known combustion processes.

In the exemplary embodiment, the integration system 200 may include a controller 206 that is communicatively coupled to the HRSG 202, or received flue flow, and to the AES 204. The controller 206 may selectively control the supply of flue flow to the integration system 200 and/or the supply of auxiliary heat to the integration system 200, as will be described in detail herein.

In the exemplary embodiment, turbine engine 110 includes an intake section 112, a compressor section 114 downstream from intake section 112, a combustor section 116 downstream from compressor section 114, a turbine section 118 (e.g., an expansion turbine) downstream from combustor section 116, and an exhaust section 120. Turbine section 118 is coupled to compressor section 114 via a rotor shaft 122. Turbine section 118 is coupled to compressor section 114 and to a load 128 such as, but not limited to, an electrical generator and/or a mechanical drive application. In the exemplary embodiment, each compressor section 114 and turbine section 118 include at least one rotor disk assembly 130 that is coupled to a rotor shaft 122 to form a rotor assembly 132. Although only one combustor section 116 is illustrated, turbine engine 110 may include a plurality of combustor sections. Combustor section 116 is coupled to compressor section 114 such that the compressor section 114 is in flow communication with the combustor section 116. A fuel injector 124 is coupled to the combustor section 116. In the exemplary embodiment, the turbine engine 110 includes a manifold 126 including a plurality of the fuel injectors 124.

During operation, intake section 112 channels air towards compressor section 114 wherein the air is compressed to a higher pressure and temperature prior to being discharged towards combustor section 116, where fuel is introduced with the compressed air into one or more combustor(s). The fuel-air mixture is ignited within the combustor section 116 to generate combustion gases that are channeled towards turbine section 118. More specifically, as the fuel-air mixture is ignited, high temperature combustion gases are generated that are channeled towards turbine section 118. Turbine section 118 converts thermal energy from the combustion gas stream into mechanical rotational energy as the combustion gases impart rotational energy to turbine section 118 and to rotor assembly 132.

In some embodiments, the fuel source 150 may be a variable fuel source that is capable of selectively delivering various types and/or mixtures of fuel. Fuel source 150 may supply natural gas, liquified petroleum gases (LPG) blends, methane, hydrogen, hydrogen/natural gas blends, coke oven gas, refinery gases and/or any other suitable gas fuel or gas fuel mixture that enables engine 110 to function as described herein. The fuel supplied by the fuel source may be adjustable based on the operating conditions and/or availability of the fuel sources.

The turbine engine 110 may include one or more conduits, pipes, ducts, and/or tubes, generally referred to herein as conduits 134, used to channel fuel between components. Fuel may flow through conduits 134 from upstream components to downstream components using gravitational forces. Alternatively, and/or additionally, fuel flow may be pressurized through conduits 134 using compressors or pumps 136, for example.

In the exemplary embodiments, the power generation system 100 may be considered a combined cycle wherein waste heat from flue flows exiting the turbine section 118 are channeled to the HRSG 202 or integration system 200, thereby enabling thermal energy from the flue flows to be used to produce power in addition to the power produced by the gas turbine engine 110. As mentioned above, the working fluid will be the gaseous flue flow exhausted from the exhaust section 120, and the HRSG 202 utilizes the hot flue flow to provide heat to a sCO$_2$ power cycle. In the exemplary embodiment, the HRSG 202 may have a cascade cycle arrangement. In some embodiments, flow within the cascade cycle may be split between a high temperature heater (HTH) and a low temperature heater (LTH). Exemplary arrangements of the integration system for generating power using thermal energy extracted from either, or both, a flue flow and an auxiliary energy source will be described in detail with respect to FIGS. 2-5. In some embodiments, the integration systems 200 described herein may be considered a bottoming cycle, and the system 100 may be considered a combined cycle.

In the exemplary embodiment, the integration system 200 may be operated in one of a plurality of modes, thus enabling the integration system 200 to generate power from the flue flow only, from the flue flow as well as from the AES 204

(when available), or from the AES 204 only. In the exemplary embodiment, the operating modes include a base mode, a combination mode, and/or an auxiliary mode. In the base mode, the integration system 200 generates power from the hot flue flow, e.g., exiting a gas turbine engine. In the combination mode, the integration system 200 generates power using both the hot flue flow and auxiliary heat from the AES 204. In the auxiliary mode, the integration system 200 generates power using only auxiliary heat from the AES 204.

The controller 206 may be associated with a computer and a processor. As used herein, the terms "processor" and "computer" and related terms, e.g., "processing device," "computing device," and "controller" are not limited to just those integrated circuits referred to in the art as a computer, but instead refer broadly to a microcontroller, a microcomputer, a programmable logic controller (PLC), an application specific integrated (API) circuit, and/or other programmable circuits, and such terms are used interchangeably herein. In the embodiments described herein, memory may include, but is not limited to, a computer-readable medium, such as a random-access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to only being, computer peripherals associated with an operator interface such as a mouse and a keyboard. Alternatively, other computer peripherals may also be used such as, but not limited to, a scanner or a touchscreen. Furthermore, in the embodiments described herein, additional output channels may include, but are not limited to only being, an operator interface monitor. The controller 206 may be programmed to control the integration system 200, automatically, based on feedback from one or more sensors described herein, and/or manually by allowing an operator to selectively adjust an operation mode of the integration system 200.

Figure 2:
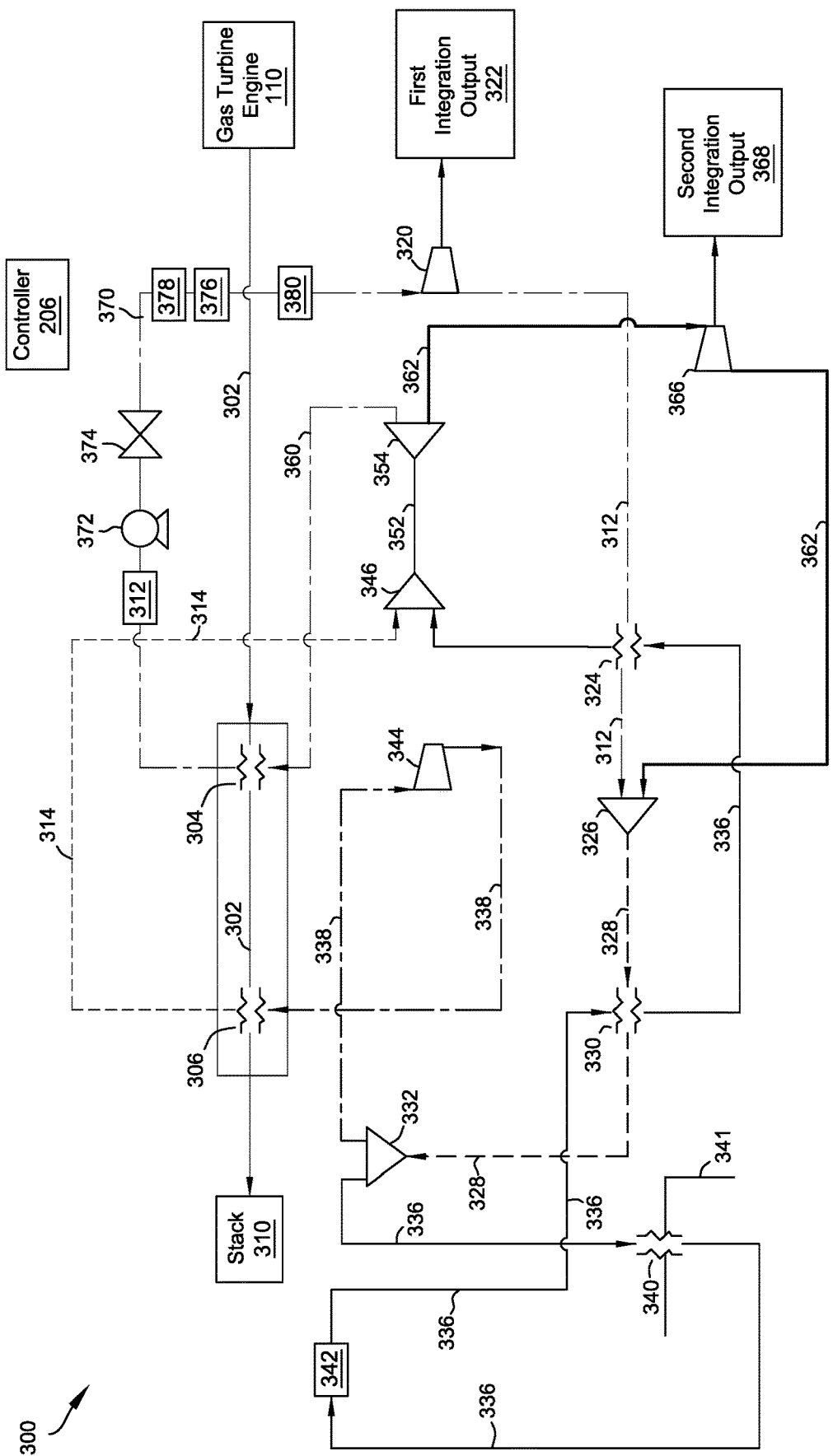
FIG. 2 is a schematic illustration of an exemplary integration system that may be used with the power generation system shown in FIG. 1, for example.

FIG. 2 is a schematic view of an exemplary integration system 300 that may be used as the integration system 200 shown in FIG. 1. In the exemplary embodiment, the integration system 300 includes a flue flow 302, e.g., exhaust gases discharged from the gas turbine engine 110. The flue flow 302 flows into a high temperature heat (HTH) exchanger 304, also referred to herein as a first heat exchanger 304, where thermal energy is transferred from the flue flow (combustion gases having been expanded through the turbine section 118 and exhausted through the exhaust section 120) to the working fluid (e.g., sCO$_2$) of the integration system 300. The flue flow 302 then exits the HTH 304 and flows into the low temperature heat (LTH) exchanger 306, also referred to herein as a second heat exchanger 306, where again thermal energy is transferred from the flue flow to the working fluid of the integration system 300. Having been depleted of its thermal energy by the first heat exchanger 304 and the second heat exchanger 306, the flue flow 302 then exits the LTH exchanger 306 and is discharged from the integration system 300 through an exhaust stack 310. In some embodiments, the LTH exchanger 306 and the HTH exchanger 304 may be referred to herein as the waste heat recovery system. In some embodiments, the LTH exchanger 306 and the HTH exchanger 304 are incorporated in the heat recovery steam generator 202.

In the exemplary embodiments, the working fluid of the integration system 200, 300 may include supercritical carbon dioxide (sCO$_2$), e.g., CO$_2$ that is at a supercritical state having a temperature and a pressure above its critical point as a supercritical fluid. In some alternative embodiments, the working fluid may include water vapor and/or steam. In some embodiments, the carbon dioxide (CO$_2$) may be subcritical. In some embodiments, the sCO$_2$ working fluid may be maintained at, or above, a temperature and/or a pressure (e.g., 31° C. at 7.4 MPa or 74 bars), such that the working fluid is supercritical at any, or all, locations within the system, e.g., within or between components. The integration system may be a closed loop system and working fluid may be introduced into any suitable location on the loop. For example, once the integration system 200 reaches a steady-state condition, the system 200 may operate as a closed-loop system.

In some embodiments, a working fluid inventory is controlled and maintained by an inventory management system (not shown). The inventory management system includes a tank for maintains CO$_2$ at a pressure between a compressor intake pressure and a compressor discharge pressure. If the overall inventory in the loop needs to be increased (to, for example, raise the steady-state inlet pressure of the compressor), an actively managed control valve between the inventory management tank and the compressor inlet may be opened allowing working fluid to be transferred from the relatively higher-pressure inventory management tank to the compressor inlet, introducing working fluid into the closed loop. If working fluid inventory needs to be decreased (for example, to reduce the inlet pressure of the compressor), a control valve between the inventory management tank and the compressor discharge will be opened, allowing relatively high-pressure compressor discharge working fluid to be extracted from the loop into the inventory management tank.

By operating with sCO$_2$ close to the critical point of the fluid, the compressor consumes less work than if the fluid behaved as an ideal gas in a typical Brayton cycle, thereby increasing thermal efficiency of the systems described herein. Additionally, because of the favorable thermofluid properties of the working fluid the turbomachinery (turbines and compressors) can be much smaller, e.g., smaller capacity or footprint, as compared to conventional power plants, thereby reducing capital costs.

The integration system 300 includes a high temperature flow 312 and a low temperature flow 314. The high temperature flow 312 exits the HTH exchanger 304 and enters a first turbine 320 to produce a first integration system power output 322. In the exemplary embodiment, the first integration system power output 322 may be approximately 12.6 MW. In other embodiments, the first integration system power output 322 may be greater than or less than 12.6 MW. The high temperature flow 312 then exits the first turbine 320 and enters a first, high temperature recuperator (HTR) 324. From the HTR 324, the high temperature flow 312 enters a first mixer 326 where it is combined with another flow as described in more detail below. In the exemplary embodiment, a flow 328 exits the first mixer 326 and is channeled into a second recuperator 330. In some embodiments, the HTR 324, the first mixer 326, and the recuperator 330 may be referred to as a recuperation system.

Flow 328 exiting the recuperator 330 is separated into a first split flow 336 and a second split flow 338 by a first splitter 332. The first split flow 336 flows through a cooler 340 prior to the flow 336 entering a compressor system 342. The cooler 340 reduces the temperature of the first split flow 336, for example, by rejecting heat to a low temperature water source (e.g., lake or river water) prior to the flow 336 entering the compressor 342. For example, cooler 340 may also receive flow 341 for exchanging heat with flow 336 in cooler 340. The first split flow 336 exits the compressor system 342 with a higher pressure and is channeled into the recuperator 330. Within recuperator 330, first split flow 336 and flow 328 are in thermal communication. In some embodiments, heat is transferred from flow 328 to the first split flow 336 such that the temperature of the first split flow 336 is higher after flowing through the recuperator 330, and such that the temperature of flow 328 is reduced. The first split flow 336 then enters the HTR 324 where first split flow 336 and flow 312 are in thermal communication enabling heat to be transferred from flow 312 to first split flow 336. As such, the temperature of the first split flow 336 is increased after flowing through the HTR 324, while the temperature of flow 312 is reduced.

The second split flow 338 created by splitter 332 enters a re-compressor 344 wherein the pressure and temperature of second split flow 338 are each increased before the flow 338 is discharged into the LTH exchanger 306. Second split flow 338 exchanges thermal energy with flow 302 before the second split flow 338 exits the LTH exchanger 306 as flow 314.

The first split flow 336 exits the HTR 324 and then enters a second mixer 346 wherein the flow 336 is mixed with a low temperature heater flow 314 exiting LTH exchanger 306 to form a combined flow 352. More specifically, the low temperature heater flow 314 is discharged from the LTH exchanger 306 into the second mixer 346 where it is mixed with flow 336. Flow 352 is discharged from the second mixer 346 into a second splitter 354 that separates the flow 352 into a return flow 360 and a second power flow 362. The return flow 360 is channeled to the HTH exchanger 304 wherein it is heated by the flow 302 and exits the HTH 304 as flow 312. The second power flow 362 exits the second splitter 354 and is channeled into a second turbine 366 to produce an integration power output 368. Second power flow 362 is discharged from the second turbine 366 into the first mixer 326 where it is combined with flow 312 as described above. In the exemplary embodiment, the second integration system power output 368 may be approximately 13.9 MW. In other embodiments, the second integration system power output 368 may be greater than or less than 13.9 MW. In some embodiments, the second integration system power output 368 is lower than the first integration system power output 322.

The integration system 300 also includes one or more conduits, tubes, ducts, and the like, referred to herein as conduits 370 that channel working fluid between components of the system 300. In the exemplary embodiment, the integration system 300 further includes one or more flow motive devices 372, e.g., pumps, fans, blowers, and the like, used to move working fluid through the conduits 370. In some embodiments, differential pressure and/or gravitational forces may be used to motivate working fluid between components. Flow motive devices 372 may be coupled to the controller 206 to enable the controller 206 to selectively adjust the mass, mass flow rate, and/or flow velocity of the working fluid between components of system 300. The integration system 300 may also include one or more additional flow control devices 374, e.g., valves, control valves, ball valves, gates, etc., to facilitate enhanced control of the flow of working fluid. Such additional flow control devices 374 are coupled to the controller 206, which controls the opening, closing, and metering of the flow control devices 374.

In the exemplary embodiment, the integration system 300 further includes at least one temperature sensor 376 coupled in communication with controller 206. Each temperature sensor 376 may be positioned between components, e.g., at conduits 370, for detecting the temperature of the working fluid contained within the conduits 370. The integration system 300 may also include at least one pressure sensor 378 coupled with controller 206. The pressure sensors 378 may be coupled between components, e.g., at conduits 370, for detecting the pressure of the working fluid contained within the conduits 370. In some embodiments, the integration system 300 also includes at least one flow sensor 380, for detecting the flow rate, flow velocity, or mass flow rate of working fluid moving through the conduits 370. The flow sensors 380 may be communicatively coupled to the controller 206. In some embodiments, the temperature sensors 376, the pressure sensor 378, and/or the flow sensor 380 may be coupled within, or in close proximity to, the components of system 300. For example, temperature sensors 376 may be coupled in close proximity to HTH exchanger 304 to detect the operating temperature within, and/or a temperature differential across, HTH exchanger 304. The sensors 376, 378, and 380 may be coupled in close proximity to, or at, any of the components of system 300. Sensor data, collected by sensors 376, 378, and 380, may be transmitted to the controller 206 wirelessly.

Figure 3A:
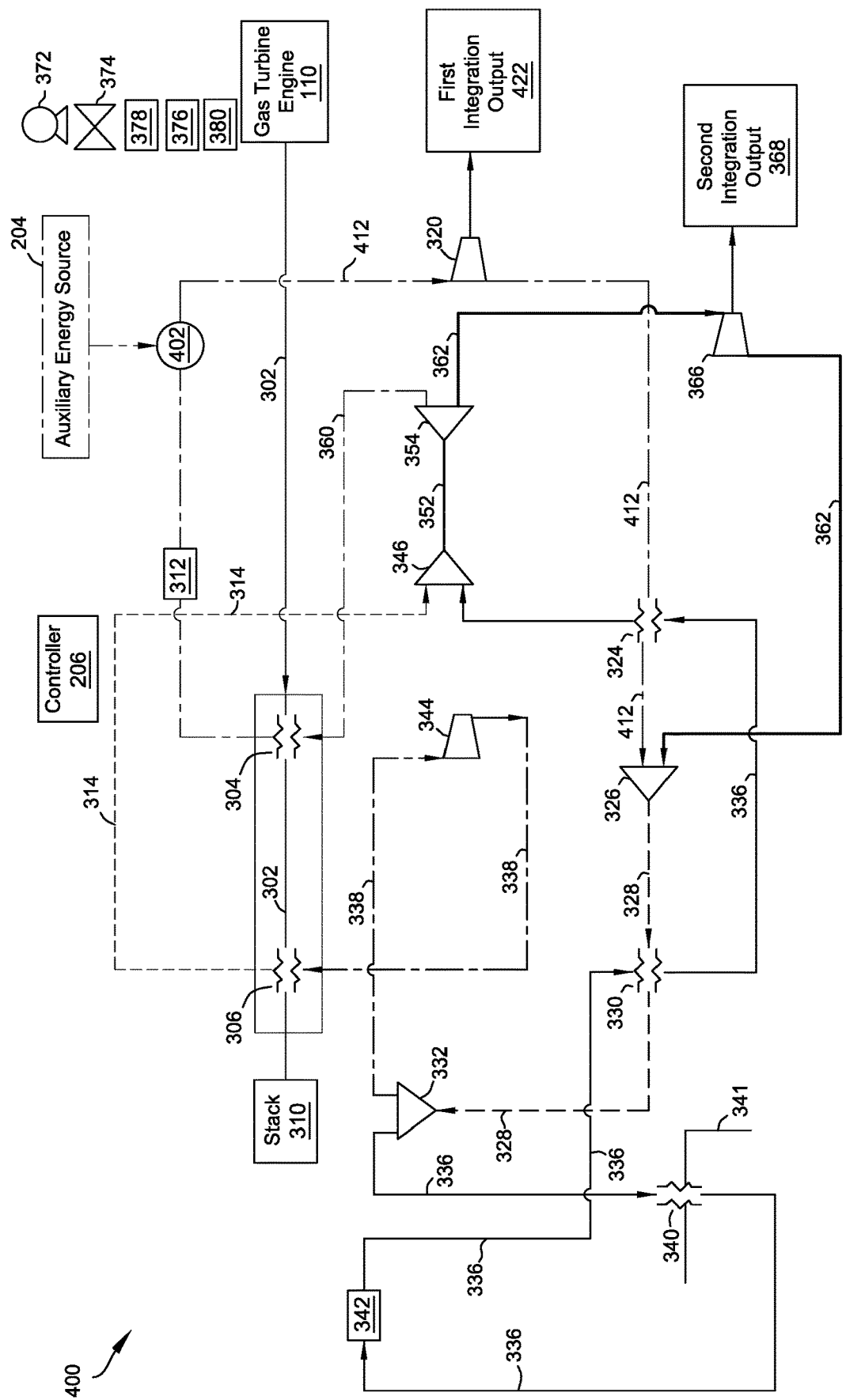
FIG. 3A is a schematic illustration of another exemplary integration system including a flue flow energy source and an auxiliary energy source that may be used with the power generation system shown in FIG. 1.

FIG. 3A is a schematic view of an exemplary integration system 400. System 400 may include one or more components or flows as within system 300. In the exemplary embodiment, system 400 receives the flow 312 exiting the HTH exchanger 304. The flow 312 enters a supplemental heat exchanger 402 and is heated prior to being discharged with a higher temperature as flow 412. For example, in some embodiments, the temperature of flow 312 entering the supplemental heat exchanger 402 is approximately 500° C., and the temperature of the flow 412 exiting the supplemental heat exchanger 402 is approximately 600° C. Accordingly, in the exemplary embodiment, the supplemental heat exchanger 402 increases the temperature of flow 312 by around 100° C. In other embodiments, the supplemental heat exchanger 402 may increase the temperature of flow 312 by more than 100° C., such as by at least 200° C. Heat is supplied to the supplemental heat exchanger 402 via an external heat source. In the exemplary embodiments, heat is supplied to the supplemental heat exchanger 402 by the AES 204.

The flow 412 enters the first turbine 320 and produces a first integration system power output 422. In the exemplary embodiment, the first integration system power output 422 may be approximately 13.1 MW. In other embodiments, the first integration system power output 422 may be less than the first integration system power output 322.

In some embodiments, integration system 400 may be operated in any of the plurality of modes, e.g., the base mode, the combination mode, or the auxiliary mode. For example, the integration system 400 may be operated in a combined mode. For example, a combined mode may include a combined gas turbine and solar mode, wherein the integration system 400 may generate power from flue flow and energy obtained from a solar energy source.

In some embodiments, the integration system 400 may be operated in a base mode, wherein power is generated using flue flow only, and the supplemental heat exchanger 402 is turned off, and/or AES 204 is not delivering thermal energy to the supplemental heat exchanger 402.

Figure 3B:
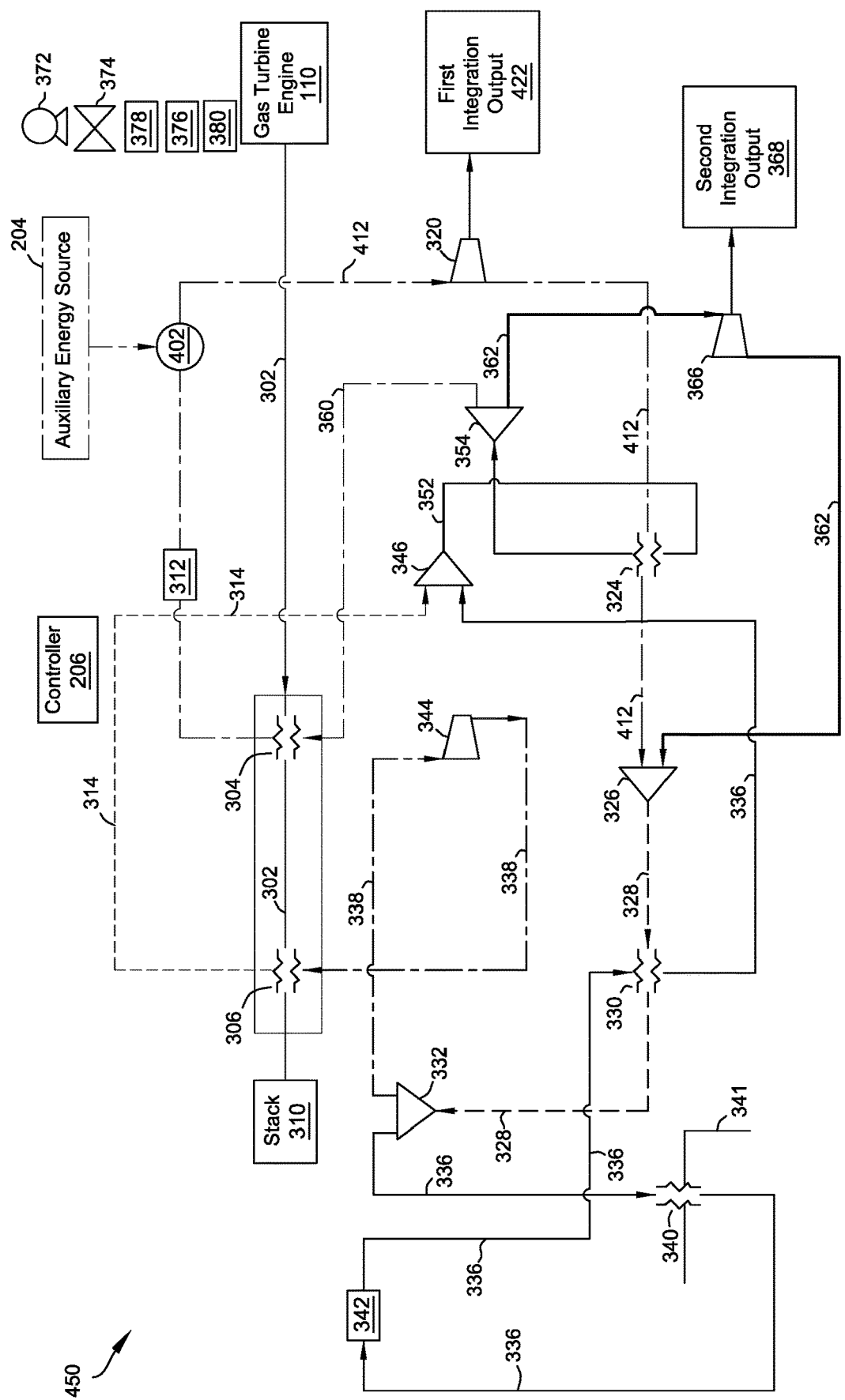
FIG. 3B is a schematic illustration of another exemplary integration system including a flue flow energy source and an auxiliary energy source that may be used with the power generation system shown in FIG. 1.

FIG. 3B is a schematic view of exemplary integration system 450 including one or more components similar to integration system 400 shown in FIG. 3A. In system 450, flow 352 exiting mixer 346 is directed to heat exchanger 324. Flow 352 exits heat exchanger 324 and is introduced into the second splitter 354. Flow 362 exits the second splitter 354 and is introduced to the second turbine 366 to generate the second integration output 368. The flow 360 exiting the splitter 354 is directed to the HTH exchanger 304 and then to the supplemental heat exchanger 402, and then flow 412 is introduced into the first turbine 320 to generate first integration output 422.

In some embodiments, the integration system 450 may be operated in a plurality of modes. In some embodiments, the integration system 450 may be run in an auxiliary mode, wherein thermal energy is not extracted from flue flow 302. For example, the integration system may be operated in a solar only mode, wherein the auxiliary energy source is solar and supplies thermal energy to the supplemental heat exchanger 402. In this solar only mode, HTH exchanger 304 and LTH exchanger 306 may be turned off or are in a standby mode. In some embodiments, in the solar only mode of integration system 450, the second turbine 366 may be turned off or in a standby mode. For example, the second power flow 362 may bypass the second turbine 366 and may be directed from the second splitter 354 to the first mixer 326.

Figure 4:
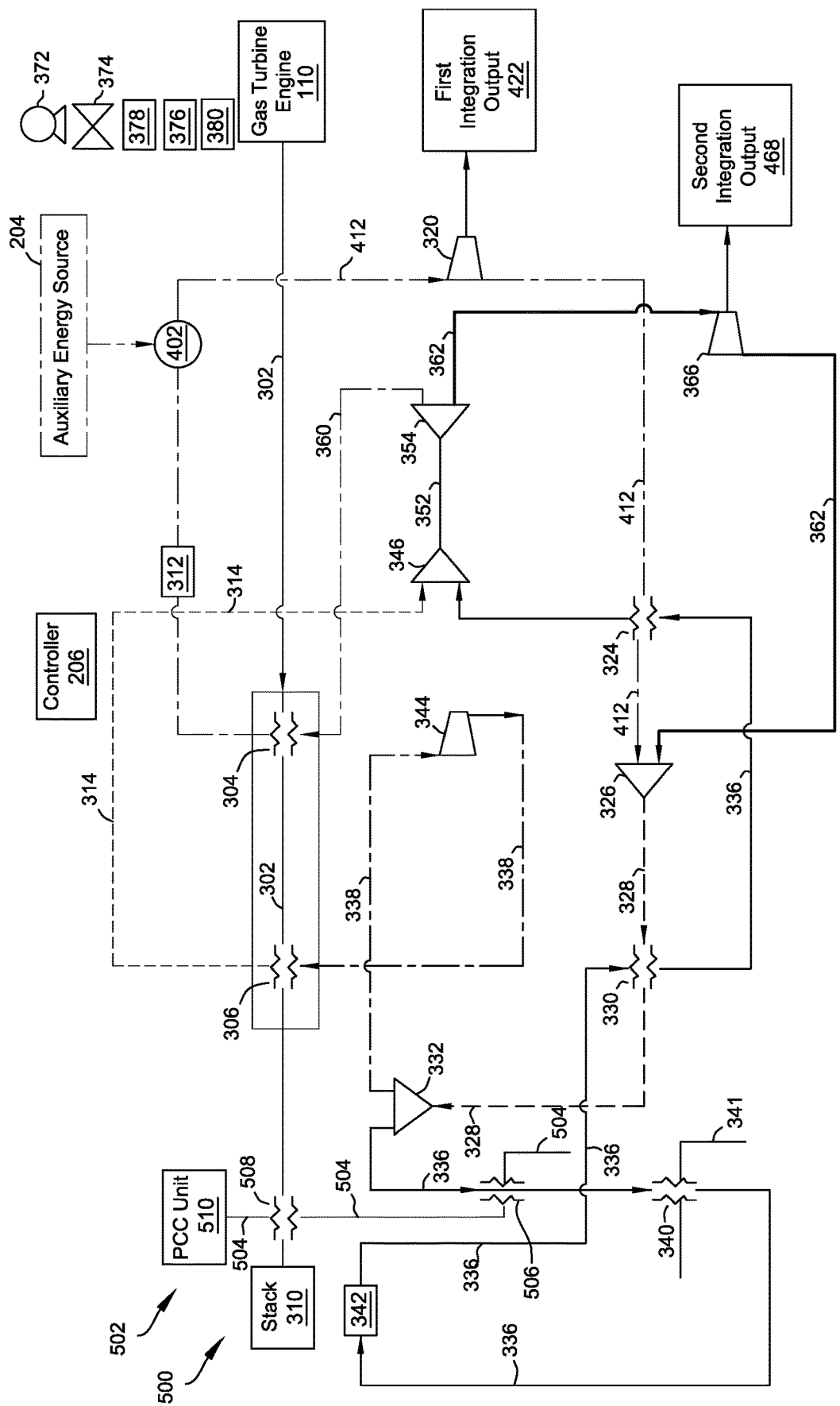
FIG. 4 is a schematic illustration of yet another exemplary integration system including a flue flow energy source and an auxiliary energy source and a post carbon capture system that may be used with the power generation system shown in FIG. 1.

FIG. 4 is a schematic view of an exemplary integration system 500 including a post-combustion carbon capture (PCC) system 502. The system 500 may include any or all of the components or flows that are the same as system 300, system 400 and/or system 450. In the exemplary embodiment, system 500 includes a coolant flow 504. In some embodiments, the coolant flow 504 is water or low-pressure steam. In other embodiments, the coolant flow 504 may be any other suitable cooling medium. The coolant flow 504 enters a heat exchanger 506 and is discharged into a second heat exchanger 508, where the coolant flow 504 exchanges heat with the flue flow 302 received from the LTH exchanger 306. Specifically, the flow 302 is cooled by coolant flow 504 before flow 302 is exhausted through the stack 310.

The coolant flow 504 exits the second heat exchanger 508, and then flow 504 enters a post-combustion capture (PCC) unit 510. In some embodiments, the system 500 may be a closed loop system for cooling coolant flow 504, and then cooled coolant flow 504 is recirculated to heat exchanger 506. The coolant flow 504 may be a fluid, e.g., water, heated first in heat exchanger 506, then heated more by the second heat exchanger 508. Once that coolant flow 504 reaches approximately 120° C., coolant flow 504 may be used to provide heat to the PCC 510 in order to capture carbon dioxide from a fluid stream (e.g., flue flow 302).

In some embodiments, the exhaust temperature of the flue flow 302 entering heat exchanger 508 may have a higher temperature (>180° C.), while maintaining similar power outputs 422 and 468, as other known $sCO_2$ power cycles that utilize lower flue flow temperatures. The heat within the flue flow 302 from the gas turbine engine 110 is sufficiently high, even after passing through HRH and LRH exchangers 304, 306, to produce the low temperature steam or hot water from coolant flow 504 and is at least sufficient to meet all the heating requirements for the PCC unit 510 of the post-combustion capture system 502. The integration system 500 including the system 502 does not require any energy bleed off from the cycle unlike a steam turbine (i.e., high temperature steam extraction would be required to operate the PCC system with a steam Rankine cycle, which may negatively impact overall cycle efficiency). Accordingly, there is minimal to no energy penalty associated with the heating demand of the PCC unit 510 (noting that the small energy penalty of PCC unit 510 owing to the electric auxiliary loads remains). The flow 302 exiting the heat exchanger 508 may enter stack 310.

The first split flow 336 exiting the first splitter 332 is discharged into the first heat exchanger 506, where the first split flow 336 is cooled by coolant flow 504. Accordingly, coolant flow 504 is heated by first split flow 336 at first heat exchanger 506 and by flue flow 302 at second heat exchanger 508 prior to entering the PCC unit 510.

In some embodiments, the temperature and the heat duty rejected from the first heat exchanger 506 and the heat available at the second heat exchanger 508 vary as a function of ambient temperature, a load on the power generation system 100, and/or a turbine inlet temperature. In some embodiments, the controller 206 may maintain both the temperature and the heat duty rejected by the heat exchangers 506 and/or 508, to meet a heating demand of heat exchangers 506 and/or 508, for different ambient temperatures or loads. In some embodiments, a split fraction of the re-compressor 344 is actively adjusted and/or controlled by the controller 206.

The heat rejected by the heat exchanger 506 and 508 reduces significantly during low load conditions, e.g., during turndown of the gas turbine engine 110. In some embodiments, system 100 includes a thermal energy storage system for storing the excess rejected heat during full load demands and supplies the stored heat to heat exchangers 506, 508 when the power generation system 100 is operating at extreme load conditions, thereby reducing inefficiency caused by the re-compressor 344 split fraction adjustment.

The integration system 500 may be operated in any of the plurality of modes, e.g., base mode, combination mode, and/or auxiliary mode. In some embodiments, the PCC unit 510 may not be operating while the integration system 500 is operated in the auxiliary mode, and the PCC unit 510 may be operated during the combination mode or the base mode. In embodiments when the integration system 500 is operated in the auxiliary mode, the integration system 500 does not receive flue flow 302, and/or HTH and LTH exchangers 304, 306 are turned off or in standby mode. In some embodiments, the integration system 500 may be operated in the base mode and does not receive auxiliary energy from the auxiliary energy source 204, while the PCC unit 510 is operating, e.g., capturing carbon dioxide.

Figure 5A:
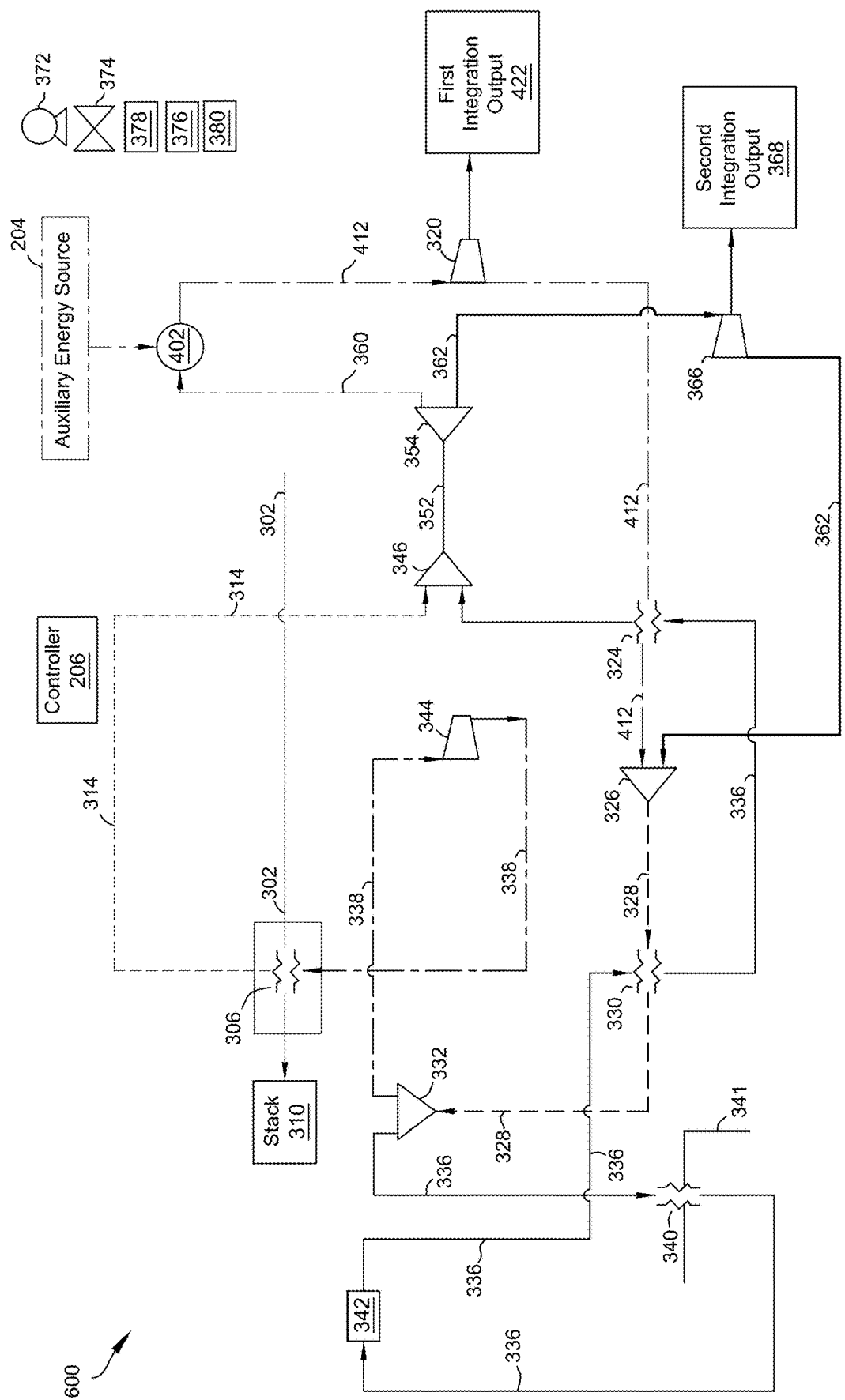
FIG. 5A is a schematic illustration of a further exemplary integration system including a flue flow energy source and an auxiliary energy source that may be used with the power generation system shown in FIG. 1.

FIG. 5A is a schematic view of another exemplary integration system 600. System 600, in the exemplary embodiment, does not include the HTH exchanger 304, i.e., includes just LTH exchanger 306. The integration system 600 may be run in any of the plurality of modes. For example, when the integration system 600 is run in the auxiliary mode, the integration system 600 does not receive flue flow 302. Rather, in the auxiliary mode, the integration system 600 receives thermal energy from the AES 204 only, and LTH 306 may be turned off or placed in a standby mode.

The return flow 360 exits second splitter 354 and enters supplemental heat exchanger 402 wherein the return flow 360 collects heat from the supplemental heat exchanger 402, such that the return flow 360 has a higher temperature after leaving the supplemental heat exchanger 402. Flow 412 exits supplemental heat exchanger 402 and is channeled to the first turbine 320, as described above.

Figure 5B:
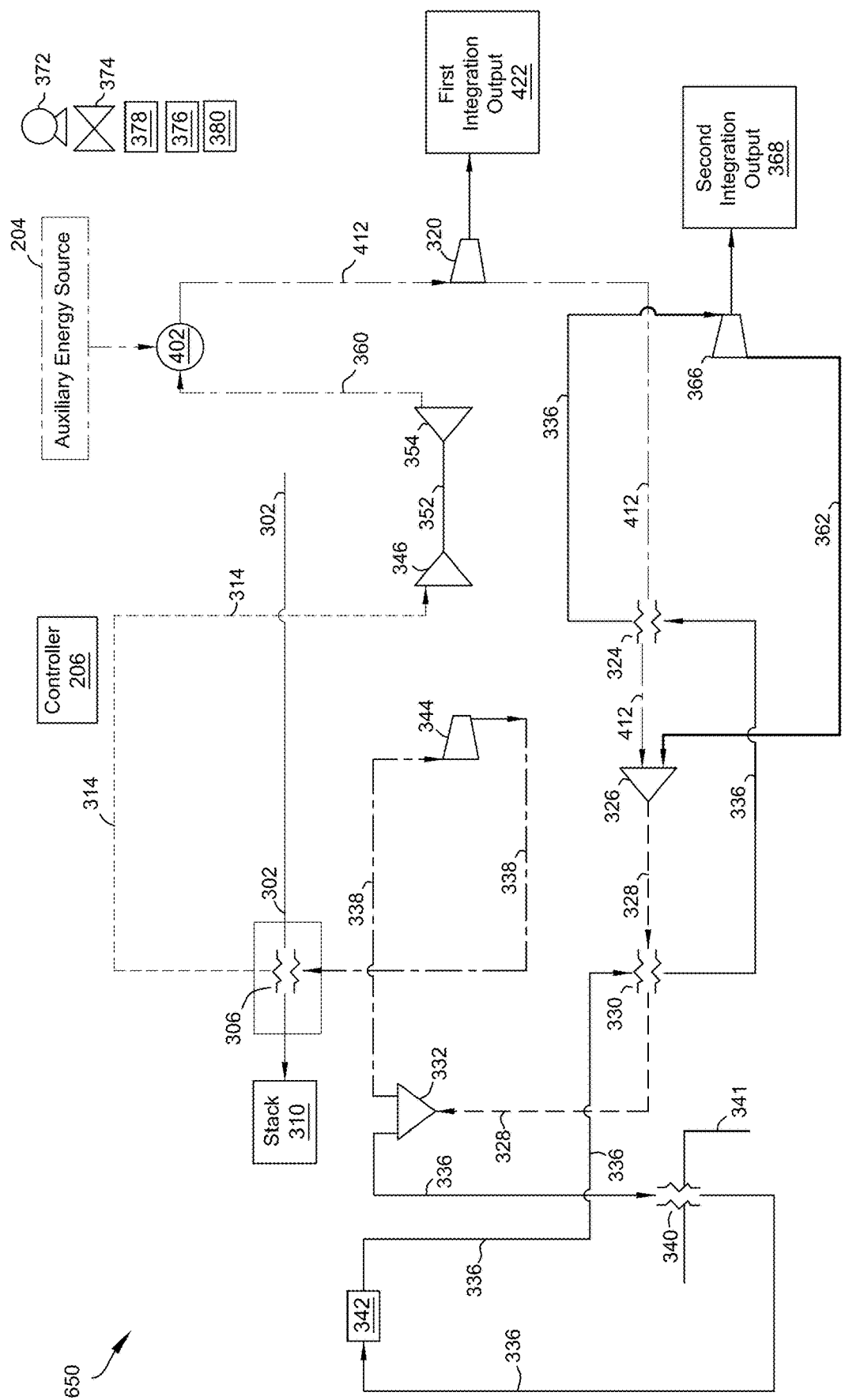
FIG. 5B is a schematic illustration of a further exemplary integration system including a flue flow energy source and an auxiliary energy source that may be used with the power generation system shown in FIG. 1.

FIG. 5B is a schematic view of exemplary integration system 650 including one or more similar components similar to integration system 600 shown in FIG. 5A. In system 650, flow 336 is introduced to recuperator 330 and then directed to heat exchanger 324 and is then directed into the second turbine 366 to generate second integration output 368.

In some embodiments, integration system 650 may be operated in any of the plurality of modes. For example, in some embodiments, integration system 650 may be operated in the auxiliary mode, wherein the integration system 650 does not receive flue flow and/or LTH exchanger 306 is turned off or in standby mode.

Figure 6:
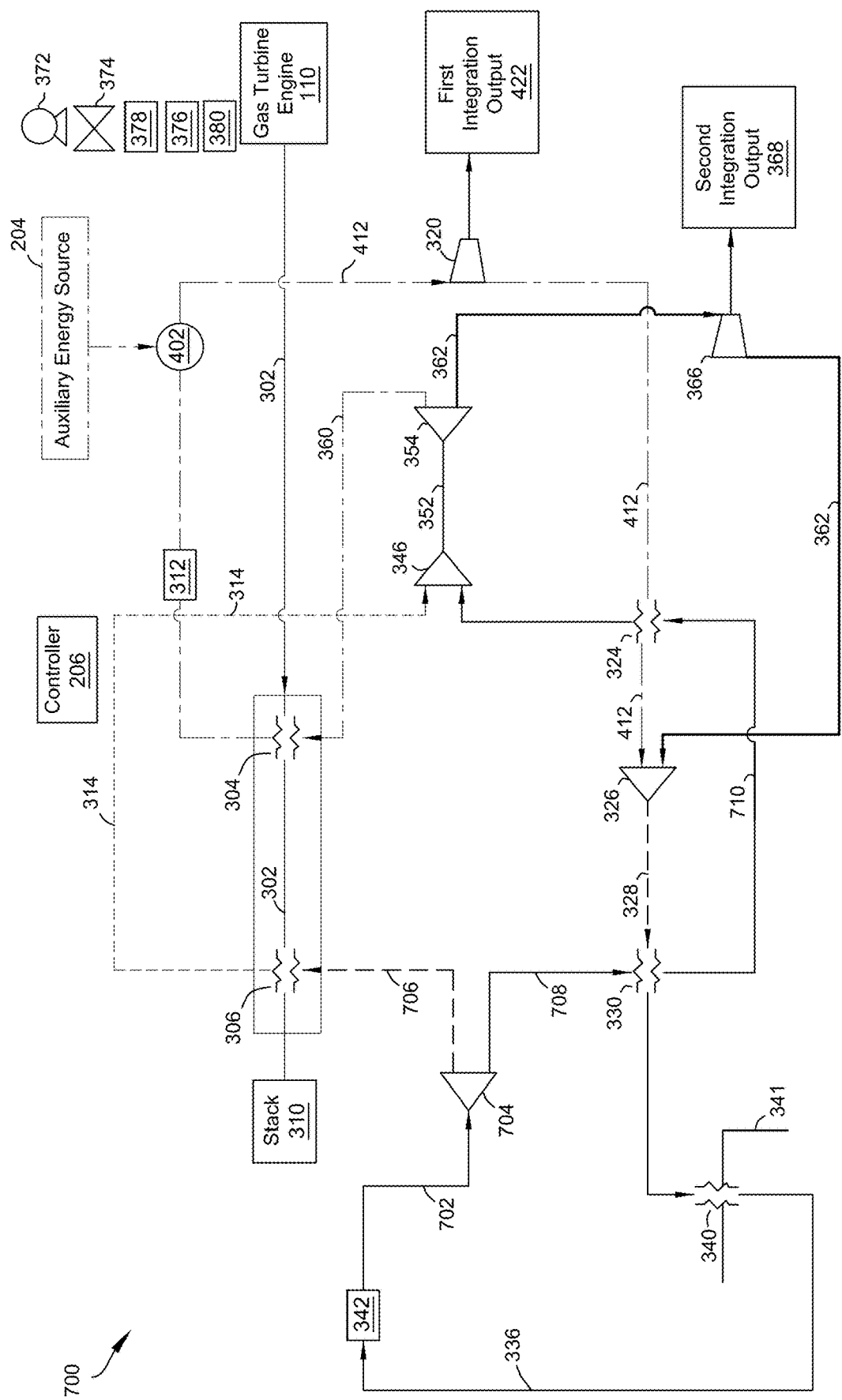
FIG. 6 is a schematic illustration of a further exemplary integration system including a flue flow energy source and an auxiliary energy source that may be used with the power generation system shown in FIG. 1.

FIG. 6 is a schematic view of an alternative integration system 700 including one or more similar components to integration system 300 shown in FIG. 2. In system 700, flow 336 enters compressor 342 resulting in flow 702 which is introduced to splitter 704. Flows 706 and 708 exit splitter 704. Flow 706 is introduced into the LTH exchanger 306, and flow 708 is introduced into the recuperator 330 and exits the recuperator 330 as flow 710. Flow 710 exits recuperator 330 and is introduced into heat exchanger 324. Flow 710 exits heat exchanger 324 and is introduced into second mixer 346 where it is combined with flow 314. Integration system 700 may be operated in any of the plurality of operation modes.

Figure 7:
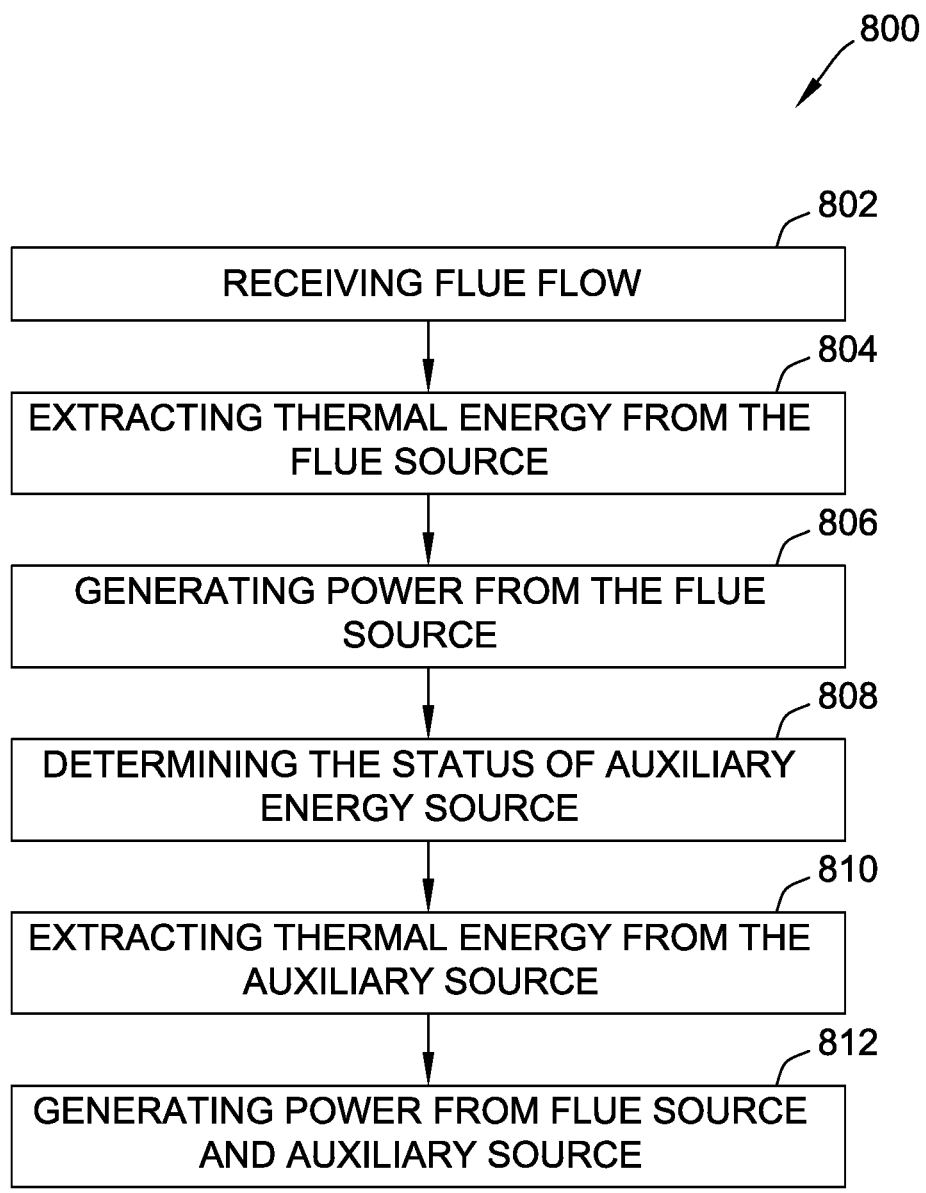
FIG. 7 is a process flow diagram of an exemplary method of controlling an integration system including a flue flow energy source and an auxiliary energy source, for example.

FIG. 7 is a process flow of an exemplary method 800 of operating an integration system for generating power extracted from one or both of a flue flow and an auxiliary energy source. Moreover, the method 800 described in FIG. 7 could be used with any of the integration systems 200, 300, 400, 450, 500, 600, 650, and 700, described herein, for example. One or more steps of method 800 may be performed by controller 206, for example. Method 800 includes receiving 802 flue flow, e.g., from an exhaust section 120 of the gas turbine engine 110. Method 800 may include supplying, e.g., delivering, the flue flow 302 to one or more heat exchangers, e.g., the HTH exchanger 304 and/or the LTH exchanger 306. The method includes extracting 804 thermal energy from the flue flow using the heat exchanger(s) 304, 306. The controller 206 may control/regulate the flow, e.g., velocity or mass flow rate, of the flue flow 302 being delivered to the heat exchangers 304, 306. For example, the flue flow 302 may be supplied via the controller 206 transmitting one or more signals to flow control device 374 and/or flow motive devices 372 to selectively control the flow of the flue flow 302 channeled through conduits and delivered to heat exchangers 304, 306.

Advantageously, the HTH exchanger 304 may be able to accept hot exhaust gas, e.g., flue flow 302, at a temperature of greater than 600° C. The HTH exchanger 304 may have a temperature drop of 287° C. In some embodiments, the heat exchangers 304, 306 are sized such that a turbine inlet temperature of 600° C. could be maintained with a 640° C. flue gas temperature (e.g., an approach temperature of 40° C.). In some embodiments, the heat exchangers 304, 306 are sized to have an approach temperature of less than 50° C. Approach temperature refers to a minimum difference in temperature between flows in a heat exchanger. For example, for heat exchanger 304, the inlet temperature of the flue flow 302 minus the $sCO_2$ outlet temperature may be approximately 40° C.

Method 800 also includes supplying the flue thermal energy to one or more turbines, e.g., the first turbine 320 and/or the second turbine 366. Supplying flue thermal energy to the turbine(s) 320, 366 may include the controller 206 controlling the flow of working fluid from the heat exchangers 304, 306 to the turbines 320, 366. Method 800 includes generating 806 power using the flue thermal energy, e.g., via the first or second turbines 320, 366.

Method 800 further includes determining 808 the status of the AES 204, e.g., off/on, whether it is generating energy or not generating energy, an amount of energy that is being generated, and the like. Determining 808 may include the controller 206 detecting, using sensors 376, 378, and/or 380, whether auxiliary thermal energy is being supplied to the integration system 300 and/or to any of the integration systems 200, 400, 500, and/or 600. In some embodiments, determining 808 the status may include the controller 206 receiving one or more user inputs indicative of an operating status of the AES 204. In some embodiments, a user may selectively control, e.g., using a user interface connected to the controller 206, whether the integration system 200 should receive auxiliary thermal energy from the AES 204.

Method 800 may further include extracting 810 thermal energy, e.g., using supplemental heat exchanger 402, from the AES 204. Method 800 may also include generating 812 power using the extracted auxiliary thermal energy, e.g., supplied to turbine(s) 320, 366. In some embodiments, method 800 include supplying both the flue thermal energy and the auxiliary thermal energy to the turbine(s) 320, 366, to generate 812 power from both the flue thermal energy and the auxiliary thermal energy, e.g., simultaneously.

Method 800 may further include supplying the auxiliary thermal energy to the turbine(s) 320, 366. Supplying auxiliary thermal energy may include the controller 206 controlling the flow of auxiliary thermal energy to the turbine(s) 320, 366. Supplying may include delivering auxiliary thermal energy upstream from the turbine(s) 320, 366. Supplying may include delivering auxiliary heat to supplemental heat exchanger 402 where auxiliary thermal energy is extracted and supplied to the working fluid of the integration systems 200, 400, 500, and/or 600. In some alternative embodiments, supplying may include delivering auxiliary heat to the heat exchangers 304, 306 for extracting auxiliary thermal energy.

In some embodiments, method 800 includes returning at least a portion of the working fluid exiting the turbine(s), flow 412 and/or flow 362, to the heat exchangers 304, 306, to extract feedback thermal energy. The method 800 may further include supplying the extracted thermal energy, e.g., flue thermal energy, auxiliary thermal energy, and/or the feedback thermal energy to the turbine(s) 320, 366 to extract power.

In some embodiments, method 800 includes supplying flows 412 and/or flow 362 to one or more other components of the integration system 200, 400, 500, and 600. For example, method 800 may include supplying flows 412 and/or flow 362 to a recuperator, e.g., recuperator 330; a mixer, e.g., mixers 326, 346; a re-compressor, e.g., re-compressor 344; and a cooler, e.g., cooler 340. Method 800 may include supplying flows 412 and/or flows 362 to one or more splitters, e.g., splitters 332, 354.

In some embodiments, method 800 includes supplying flows 302 and/or flows 336 to one or more components of a post-combustion capture system, e.g., system 502. In some embodiments, method 800 includes supplying flow 302 to the PCC unit 510.

In the embodiments described herein, a power generation system includes an integration system for incorporating intermittent energy sources, such as a renewable energy source, with a heat recovery steam generator to produce power. In embodiments described herein, the integration system may be operated in one or more of a plurality of operating modes, enabling power to be generated from the intermittent energy source, when or if available, in addition to consistently generating energy from flue flow exiting a gas turbine engine. Embodiments described herein enable a consistent supply of power to be generated as demanded by the power grid or a mechanical load, while improving emissions by utilizing renewable energy sources when available. In embodiments described herein, the technical gap between power generated using flue gases and power generated using an auxiliary energy source is bridged, enabling higher flexibility in accepting heat from both types of heat sources in an efficient manner, with simple cycle configuration, thus offering higher reliability, and cost reduction in power generation systems.

In some embodiments described herein, the integration system generates power using a first turbine and a second turbine, which extracts power from thermal energy supplied either from the flue flow and/or thermal energy supplied from an intermittent energy source. In some embodiments described herein, the integration system includes a post-combustion carbon capture system. The flue flow temperature is relatively hotter (approx. 180 to 200° C.) after the power cycle which can be used to heat hot water or low-pressure steam for meeting the heat demand of the post-combustion carbon capture system. In embodiments described here, as compared to some known steam cycles having lower heat rejection temperature, therefore, the heat energy required by the PCC will be a performance loss to a steam Rankine bottoming cycle. However, in embodiments described herein, since a sCO$_2$ heat rejection temperature is approximately 180° C., the heat energy to the PCC can be extracted and not affect the performance of the sCO$_2$ bottoming cycle. The electrical loads for the PCC will be an equal parasitic loss to either the steam or sCO$_2$ cycle.

Further aspects of the present disclosure are provided by the subject matter of the following clauses:

1. An integration system for extracting power, the integration system comprising: a flue flow source configured to supply flue flow thermal energy to a heat exchanger; an auxiliary energy source (AES) configured to selectively supply auxiliary thermal energy to a supplemental heat exchanger; and a controller coupled to the flue flow source and the AES, the controller configured to: determine whether the AES is supplying auxiliary thermal energy to the supplemental heat exchanger; and if the AES is supplying auxiliary thermal energy to the supplemental heat exchanger, cause a turbine to extract power from both the flue flow thermal energy and from the auxiliary thermal energy.

2. The integration system according to any preceding clause, wherein the AES is a renewable energy source including at least one of a solar energy source, a wind energy source, a bioenergy source, a thermal energy source, and a geothermal energy source.

3. The integration system according to any preceding clause, wherein the integration system further comprises: a low temperature heat exchanger configured to extract flue thermal energy from the flue flow and to supply the extracted flue thermal energy to a first flow; a splitter configured to split the first flow into a first turbine flow and a second turbine flow; a first turbine coupled to receive the first turbine flow exiting the splitter; a second turbine coupled to receive the second turbine flow exiting the splitter; and an alternative heat exchanger between the splitter and the first turbine for supplying thermal energy to the first flow prior to the first flow entering the first turbine.

4. The integration system according to any preceding clause, wherein the integration system comprises: a high temperature heat (HTH) exchanger configured to: receive the flue flow; and extract thermal energy supplied from the flue flow; and a high temperature turbine (HTT) coupled to receive high temperature flow exiting the HTH; and an auxiliary heat exchanger between the HTH exchanger and the HTT for supplying the auxiliary thermal energy to the high temperature flow prior to entering the HTT to generate a first turbine power.

5. The integration system according to any preceding clause, further comprising: a first heat exchanger coupled to receive a coolant flow and a high temperature flow exiting the HTH exchanger; a second heat exchanger coupled to receive the flue flow and the coolant flow exiting the first heat exchanger, wherein the second heat exchanger exchanges thermal energy between the coolant flow and the flue flow; and a post-combustion capture system to receive the coolant flow after the coolant flow receives thermal energy from the first and second heat exchangers.

6. The integration system according to any preceding clause, wherein the turbine uses a working fluid including supercritical CO$_2$.

7. The integration system according to any preceding clause, wherein the controller is communicatively coupled to at least one of a pressure sensor, a temperature sensor, and a flow sensor.

8. An integration system for extracting power, the integration system comprising: a flue flow source configured to supply flue flow thermal energy to a heat exchanger; an auxiliary energy source (AES) configured to selectively supply auxiliary thermal energy to a supplemental heat exchanger; a post-combustion carbon capture system to receive the flue flow after the flue flow passes through the heat exchanger; and a controller coupled to the flue flow source, the controller configured to: cause a turbine to extract power from the flue flow thermal energy extracted by the heat exchanger and auxiliary thermal energy extracted by the supplemental heat exchanger.

9. The integration system according to any preceding clause, wherein the AES is a renewable energy source including at least one of a solar energy source, a wind energy source, a bioenergy source, a thermal energy source, and a geothermal energy source.

10. The integration system according to any preceding clause, wherein the integration system further comprises: a first heater configured to extract flue thermal energy from the flue flow and supply the extracted flue thermal energy to a first flow; a splitter configured to split the first flow into a first turbine flow and a second turbine flow; a first turbine coupled to receive the first turbine flow exiting the splitter; a second turbine coupled to receive the second turbine flow exiting the splitter; and an alternative heat exchanger between the splitter and the first turbine for supplying thermal energy to the first flow prior to the first flow entering the first turbine.

11. The integration system according to any preceding clause, wherein the integration system comprises: a high temperature heat (HTH) exchanger configured to: receive the flue flow; and extract thermal energy supplied from the flue flow; and a high temperature turbine (HTT) coupled to receive high temperature flow exiting the HTH exchanger; and an auxiliary heat exchanger between the HTH exchanger and the HTT for supplying the auxiliary thermal energy to the high temperature flow prior to entering the HTT to generate a first turbine power.

12. The integration system according to any preceding clause, wherein the integration system further comprises: a first heat exchanger coupled to receive a coolant flow and a high temperature flow exiting the HTH exchanger; a second heat exchanger coupled to receive the flue flow and the coolant flow exiting the first heat exchanger, wherein the second heat exchanger exchanges thermal energy between the coolant flow and the flue flow; and wherein the post-combustion carbon capture system is coupled to receive the coolant flow after the coolant flow receives thermal energy from the first and second heat exchangers.

13. The integration system according to any preceding clause, wherein the controller is communicatively coupled to at least one of a pressure sensor, a temperature sensor, and a flow sensor.

14. A method of operating an integration system for extracting power from an auxiliary energy source (AES), the method comprising: determining whether an auxiliary energy source (AES) is supplying auxiliary thermal energy to a supplemental heat exchanger; and if the AES is supplying auxiliary thermal energy to the supplemental heat exchanger, then causing a turbine to generate power from both a flue flow and from the auxiliary thermal energy.

15. The method according to any preceding clause, wherein the AES is a renewable energy source including at least one of a solar energy source, a wind energy source, a bioenergy source, a thermal energy source, and a geothermal energy source.

16. The method according to any preceding clause, wherein the method further comprises: extracting thermal energy from the flue flow by a high temperature heat (HTH) exchanger to create a high temperature flow; extracting auxiliary thermal energy using an auxiliary heat exchanger; supplying the extracted auxiliary thermal energy to a high temperature flow; and generating power from the high temperature flow using the turbine.

17. The method according to any preceding clause, the method further comprising: if the AES is not supplying auxiliary thermal energy to the supplemental heat exchanger, then causing the turbine to extract power from thermal energy of the flue flow.

18. The method according to any preceding clause, wherein determining whether an auxiliary energy source (AES) is supplying auxiliary thermal energy to a supplemental heat exchanger includes detecting a temperature of the AES.

19. The method according to any preceding clause, wherein the method further comprises: extracting flue thermal energy using a first heater; supplying the extracted flue thermal energy to a first flow; splitting the first flow into a first turbine flow and a second turbine flow; extracting auxiliary thermal energy using an auxiliary heat exchanger; supplying auxiliary thermal energy to the first flow; generating power from the first flow using a first turbine; and generating power from the second flow using a second turbine.

20. The method according to any preceding clause, wherein in the method further comprises capturing carbon from the flue flow using a post-combustion capture system.

The above description is meant to be exemplary only, and one skilled in the art will recognize that changes may be made to the embodiments described without departing from the scope of the invention disclosed. Modifications, which fall within the scope of the present invention, will be apparent to those skilled in the art, in light of a review of this disclosure, and such modifications are intended to fall within the appended claims.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments of systems and methods, including the best mode, and also to enable any person skilled in the art to practice the systems and methods, including making and using any devices or systems and performing any incorporated methods. The patentable scope of the systems and methods is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An integration system for extracting power from an auxiliary energy source (AES), the integration system comprising:
    a flue flow source configured to supply a flue flow having flue flow thermal energy to a first heat exchanger, the first heat exchanger being configured to extract flue flow thermal energy from the flue flow and to supply the flue flow thermal energy to a first flow;
    a first splitter configured to split the first flow into a first turbine flow and a second turbine flow;
    a first turbine coupled to receive the first turbine flow exiting the first splitter;
    a second turbine coupled to receive the second turbine flow exiting the first splitter;
    the auxiliary energy source (AES) configured to selectively supply auxiliary thermal energy to a supplemental heat exchanger disposed between the first splitter and the first turbine; and
    a controller coupled to the flue flow source and the AES, the controller configured to:
        determine whether the AES is supplying auxiliary thermal energy to the supplemental heat exchanger; and
        when the AES is supplying auxiliary thermal energy to the supplemental heat exchanger, cause the first turbine to extract power from the first flow including both the extracted flue flow thermal energy and the auxiliary thermal energy.

2. The integration system in accordance with claim 1, wherein the AES is a renewable energy source including at least one of a solar energy source, a wind energy source, a bioenergy source, a thermal energy source, and a geothermal energy source.

3. The integration system in accordance with claim 1, wherein the first heat exchanger further comprises
    a low temperature heat exchanger configured to extract flue flow thermal energy from the flue flow and to supply the extracted flue flow thermal energy to the first flow of a working fluid.

4. The integration system in accordance with claim 3, wherein the first heat exchanger comprises:
    a high temperature heat (HTH) exchanger configured to:
        receive the flue flow; and
        extract flue flow thermal energy supplied from the flue flow, wherein the first turbine is a high temperature turbine (HTT) coupled to receive high temperature flow exiting the HTH exchanger and configured to generate a first turbine power output; and wherein the HTH exchanger is disposed on a flow path between the first splitter and the HTT.

5. The integration system in accordance with claim 4, further comprising a post-combustion carbon capture (PCC) system comprising:
- a first PCC heat exchanger coupled to receive a coolant flow and a high temperature flow exiting a second splitter downstream of the HTH exchanger;
- a second PCC heat exchanger coupled to receive the flue flow and the coolant flow exiting the first PCC heat exchanger, wherein the second PCC heat exchanger exchanges thermal energy between the coolant flow and the flue flow; and
- a post-combustion capture (PCC) unit to receive the coolant flow after the coolant flow receives thermal energy from the first and second PCC heat exchangers, wherein the received coolant flow provides sufficient heat to meet heating requirements for the PCC unit.

6. The integration system in accordance with claim 1, wherein the first or second turbine uses a working fluid including supercritical $CO_2$.

7. The integration system in accordance with claim 1, wherein the controller is communicatively coupled to at least one of a pressure sensor, a temperature sensor, and a flow sensor.

8. An integration system for extracting power from an auxiliary energy source (AES), the integration system comprising:
- a flue flow source configured to supply a flue flow having flue flow thermal energy to a first heat exchanger, the first heat exchanger being configured to extract the flue flow thermal energy from the flue flow and to supply the flue flow thermal energy to a first flow;
- a first splitter configured to split the first flow into a first turbine flow and a second turbine flow;
- a first turbine coupled to receive the first turbine flow exiting the first splitter;
- a second turbine coupled to receive the second turbine flow exiting the first splitter;
- the auxiliary energy source (AES) configured to selectively supply auxiliary thermal energy to a supplemental heat exchanger disposed between the first splitter and the first turbine;
- a post-combustion carbon capture system to receive the flue flow after the flue flow passes through the first heat exchanger; and
- a controller coupled to the flue flow source and the AES, the controller configured to:
  - cause a first turbine to extract power from the first flow including the flue flow thermal energy extracted by the first heat exchanger and auxiliary thermal energy extracted by the supplemental heat exchanger.

9. The integration system in accordance with claim 8, wherein the AES is a renewable energy source including at least one of a solar energy source, a wind energy source, a bioenergy source, a thermal energy source, and a geothermal energy source.

10. The integration system in accordance with claim 8, wherein the integration system further comprises:
- a low temperature heat exchanger configured to extract flue flow thermal energy from the flue flow and supply the extracted flue flow thermal energy to the first flow.

11. The integration system in accordance with claim 10, wherein the first heat exchanger comprises:
- a high temperature heat (HTH) exchanger configured to:
  - receive the flue flow; and
  - extract the flue flow thermal energy supplied from the flue flow; and
- wherein the first turbine is a high temperature turbine (HTT) coupled to receive high temperature flow exiting the HTH exchanger and configured to generate a first turbine power output, and
- wherein the HTH exchanger is disposed on a flow path between the first splitter and the HTT.

12. The integration system in accordance with claim 11, further comprising a post-combustion carbon capture (PCC) system comprising:
- a first PCC heat exchanger coupled to receive a coolant flow and a high temperature flow exiting a second splitter downstream of the HTH exchanger;
- a second PCC heat exchanger coupled to receive the flue flow and the coolant flow exiting the first PCC heat exchanger, wherein the second PCC heat exchanger exchanges thermal energy between the coolant flow and the flue flow; and
- a post-combustion carbon capture (PCC) unit coupled to receive the coolant flow after the coolant flow receives thermal energy from the first and second PCC heat exchangers, wherein the received coolant flow provides sufficient heat to meet heating requirements for the PCC unit.

13. The integration system in accordance with claim 8, wherein the controller is communicatively coupled to at least one of a pressure sensor, a temperature sensor, and a flow sensor.

14. A method of operating an integration system for extracting power from an auxiliary energy source (AES), the method comprising:
- extracting flue flow thermal energy from a flue flow using a first heat exchanger;
- supplying the extracted flue flow thermal energy to a first flow;
- splitting, via a splitter, the first flow into a first turbine flow and a second turbine flow;
- determining, via a controller, whether the auxiliary energy source (AES) is supplying auxiliary thermal energy to a supplemental heat exchanger disposed between the splitter and a first turbine; and
- when the AES is supplying auxiliary thermal energy to the supplemental heat exchanger, then causing the first turbine to generate power from the first flow including both the flue flow thermal energy and the auxiliary thermal energy.

15. The method in accordance with claim 14, wherein the AES is a renewable energy source including at least one of a solar energy source, a wind energy source, a bioenergy source, a thermal energy source, and a geothermal energy source.

16. The method in accordance with claim 14, wherein the method further comprises:
- extracting thermal energy from the flue flow by a high temperature heat (HTH) exchanger to create a high temperature flow;
- extracting auxiliary thermal energy using the supplemental heat exchanger;
- supplying the extracted auxiliary thermal energy to the high temperature flow; and
- generating power from the high temperature flow using the first turbine.

17. The method in accordance with claim 16, wherein determining whether an auxiliary energy source is supplying auxiliary thermal energy to a supplemental heat exchanger includes detecting a temperature of the AES, and wherein the method further comprises:

when the AES is not supplying auxiliary thermal energy to the supplemental heat exchanger, then causing the first turbine to extract power from thermal energy of the flue flow.

18. The method in accordance with claim 14, wherein the method further comprises:
- extracting auxiliary thermal energy using the supplemental heat exchanger;
- supplying auxiliary thermal energy to the first turbine flow;
- generating power from the first turbine flow using the first turbine; and
- generating power from the second turbine flow using a second turbine.

19. The method in accordance with claim 14, wherein the method further comprises capturing carbon from the flue flow using a post-combustion capture system.

* * * * *